(12) United States Patent
Verschoor et al.

(10) Patent No.: US 8,971,034 B2
(45) Date of Patent: *Mar. 3, 2015

(54) DISPLAY DEVICE WITH FLEXIBLE DISPLAY (71) Applicant: Creator Technology B. V., Breda (NL)

(72) Inventors: Volker Barnart Verschoor, Eindhoven (NL); Johannes Cornelis Adriaan Hamers, Eindhoven (NL); Hendrik Visser, Eindhoven (NL); Michael Johannes Anna Maria Walters, Eindhoven (NL)

(73) Assignee: Creator Technology B.V., Breda (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/099,891

(22) Filed: Dec. 6, 2013

(65) Prior Publication Data
US 2014/0133076 A1 May 15, 2014

Related U.S. Application Data (63) Continuation of application No. 13/211,561, filed on Aug. 17, 2011, now Pat. No. 8,605,421.

(51) Int. Cl.
H05K 5/00 (2006.01)
H05K 7/00 (2006.01)
G06F 1/16 (2006.01)
H04M 1/00 (2006.01)

(52) U.S. Cl.
CPC .................................. *G06F 1/1652* (2013.01)
USPC .............. 361/679.3; 361/679.21; 361/679.26; 361/679.55; 361/679.56; 455/575.1; 455/575.4

(58) Field of Classification Search
CPC ... G06F 1/1624; G06F 1/1626; G06F 1/1633; G06F 1/1641; G06F 1/1647; G06F 1/1652
USPC ............ 361/679.21, 679.26, 679.33, 679.55, 361/679.56, 679.3; 455/575.1–575.9
See application file for complete search history.

(56) References Cited

U.S. PATENT DOCUMENTS

| 6,016,176 | A * | 1/2000 | Kim et al. ........................ 349/84 |
| 6,377,324 | B1 * | 4/2002 | Katsura ........................... 349/58 |
| 6,577,496 | B1 * | 6/2003 | Gioscia et al. ............. 361/679.3 |
| 7,440,265 | B2 * | 10/2008 | Ou Yang .................. 361/679.27 |
| 7,558,057 | B1 * | 7/2009 | Naksen et al. ........... 361/679.56 |
| 7,667,962 | B2 * | 2/2010 | Mullen .................... 361/679.56 |
| 8,035,577 | B2 * | 10/2011 | Lafarre et al. ................... 345/55 |
| 8,125,759 | B2 * | 2/2012 | Fukuma et al. ............... 361/260 |
| 8,369,075 | B2 * | 2/2013 | Huang .................... 361/679.21 |
| 8,385,055 | B2 * | 2/2013 | Kao et al. ................. 361/679.06 |

(Continued)

Primary Examiner — Anthony Haughton (57) ABSTRACT

A display device including a device body, a continuous flexible display and a support frame is disclosed. A support frame is movable with respect to the device body between a closed configuration for fixing the flexible display in a storage position and an open configuration for fixing the flexible display in an open position. In the open configuration at least one surface support part of the support frame and the surface support part of a lower body side of the device body are positioned in one plane, enabling a supporting of the surface support part of the support frame and of the device body on a surface. In the closed configuration, the device body is partially covered by a portion of the support frame, and the flexible display is sandwiched between the device body and the portion of the support frame.

12 Claims, 5 Drawing Sheets

(56) References Cited

U.S. PATENT DOCUMENTS

| | | | |
|---|---|---|---|
| 8,787,008 B2 * | 7/2014 | Walters et al. | 361/679.21 |
| 2006/0146488 A1 * | 7/2006 | Kimmel | 361/681 |
| 2010/0164837 A1 * | 7/2010 | Kao et al. | 345/1.3 |
| 2012/0194448 A1 * | 8/2012 | Rothkopf | 345/173 |
| 2013/0314611 A1 * | 11/2013 | Okutsu et al. | 348/739 |

\* cited by examiner

DISPLAY DEVICE WITH FLEXIBLE DISPLAY

This Application is a continuation of U.S. Ser. No. 13/211,561, filed on Aug. 17, 2011, the entirety of which is incorporated by reference herein.

TECHNICAL FIELD

The present invention generally relates to display devices with a flexible display. The present invention specifically relates to display devices with a flexible display, a supporting frame and a device body.

BACKGROUND

Mobile display devices, such as mobile phones or e-readers, which make use of flexible displays have in their storage position a compact state, for instance for transportation, previewing or phone calls. In the open position they are in a reading/viewing state with the flexible display in extended position supported by a support frame.

A display device that makes use of these two states will have a specific shape that is different from mobile products that do not use flexible displays. This specific shape can make the user interaction with the device mechanically instable or can make it difficult to handle by a user.

A number of product concepts have been developed for devices with flexible displays. The most important concepts are the 'wrap', the 'book' and the 'roll'. An example of a 'wrap' concept is shown in WO 2008/054206 A2, of a 'roll' concept in WO 2006/038171 A1.

Figure 1A:
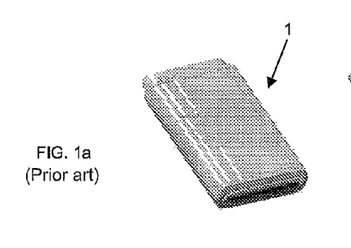
FIGS. 1a and 1b show a perspective view of a 'wrap' type device in accordance with the prior art in a storage and an operational position respectively.
Figure 1B:
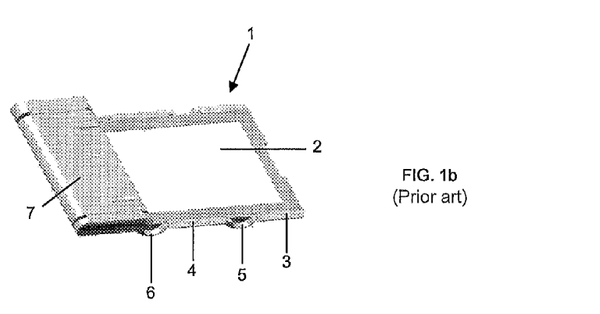
Figure 2:
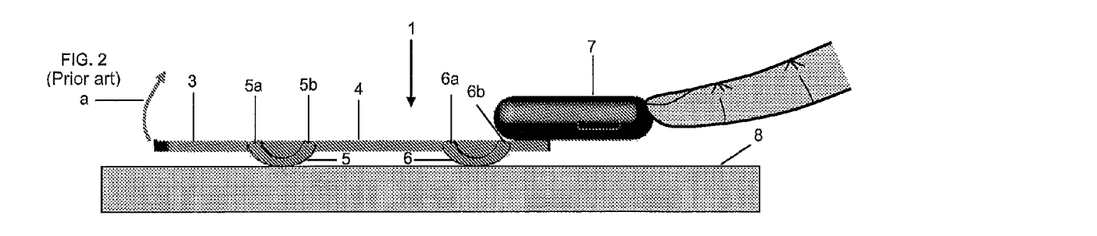
FIG. 2 shows a schematic side view of the prior art 'wrap' device of FIG. 1 in an operational position put on a surface.

One of the problems in user interaction with a mobile e-reader in the use of a prior art "wrap"-type e-reader, as shown in FIG. 1, is shown in FIG. 2. When such a device in the open position is put on a table, it is unstable and will rock or wiggle when a user is interacting with the device, e.g. touching buttons on the device to switch pages. The same problem will occur when the user holds the device in hand while pushing the buttons or touching the display in case it is a touch sensitive display.

Figure 3:
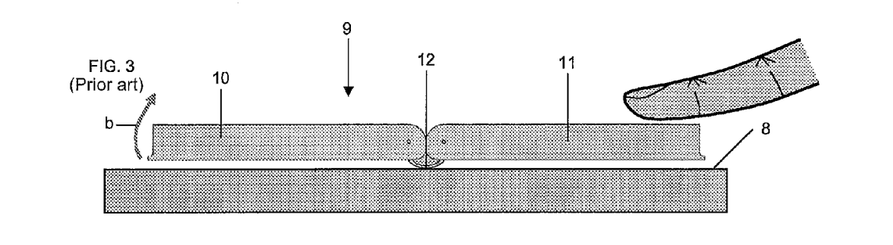
FIG. 3 shows a schematic side view of a symmetrical 'book' type device in accordance with the prior art in an operational position put on a surface.

In a 'book' type e-reader as shown in FIG. 3 for example provided with a dual hinge variant, the bridge between the book halves can be very big, and therefore stick out below the book halves in open position. This can result in the book wobbling when interacted with, while on a table.

Figure 4:
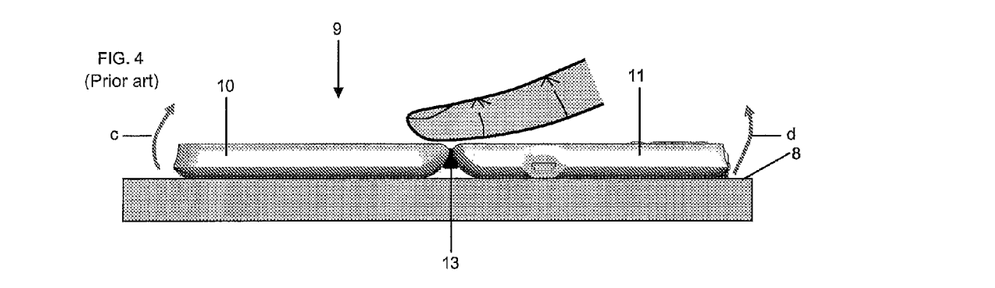
FIG. 4 shows a schematic side view of another symmetrical 'book' type device in accordance with the prior art in an operational position put on a surface.

On the other hand a problem as shown in FIG. 4 can also occur when the bridge between the book halves is very thin. Depending on the desired shape of the product if the user presses on the central part of the open book device the book halves can flip upwards.

Figure 5:
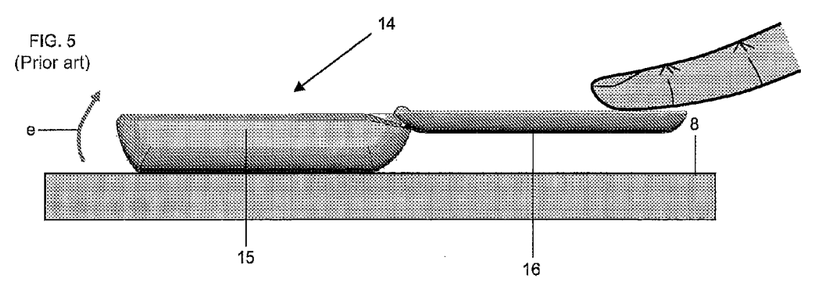
FIG. 5 shows a schematic side view of an asymmetrical 'book' type device in accordance with the prior art in an operational position put on a surface.

A special form of the book device is the so-called asymmetric book as shown in FIG. 5. In this case one half of the book is thicker than the other. This has some advantages such as weight and volume distribution and touch support. However the wiggle problem is of course even larger in this concept.

Figure 6:
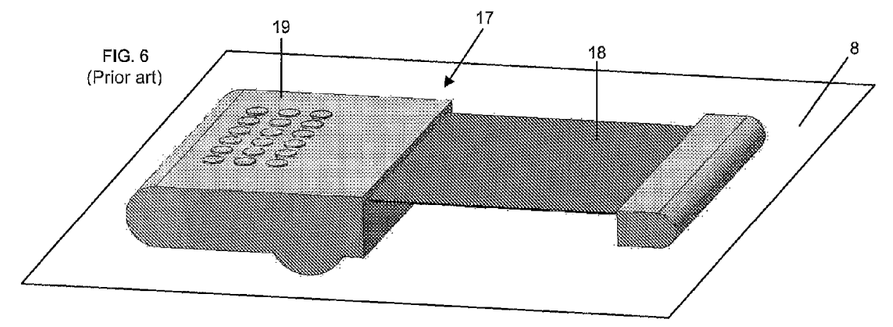
FIG. 6 shows a perspective view of a 'roll' device in accordance with the prior art in an open position put on a surface.

Another type of e-reader with a flexible display is a "roll-type" e-reader as shown in FIG. 6. When such a device is put on a table or held by hand, it can also be unstable, similar to the wrap-type device.

It is an object of the invention to improve the physical user interaction with a mobile display device provided with a flexible display.

The present invention is directed toward overcoming one or more of the problems discussed above.

SUMMARY OF THE EMBODIMENTS

According to the invention the display device comprises a device body with upper and lower body sides and has at least one surface support part for supporting the body on a surface, a continuous flexible display, a support frame configured to support at least a part of the flexible display, at least a portion of the support frame being connected with the device body and being movable with respect to the device body between a closed configuration for fixing the flexible display in a storage position and an open configuration for fixing the flexible display in an open position, and having at least one surface support part for supporting the support frame on a surface, wherein in the open configuration the at least one surface support part of the support frame and the surface support part of the lower body side are positioned in one plane, enabling a supporting of the surface support parts of the support frame and of the device body on a surface for a stable user interaction with the device in the open position of the display.

In accordance with the invention, by positioning in the open position in one common plane the surface support parts of the device body and the support frame that supports the flexible display, the freedom of movement of the device is limited during user interaction with the display device.

By doing this the device is better supported when placed on a surface such as a table. The user can interact with buttons on the device body, without creating unwanted movements of the flexible display device.

According to one embodiment of the invention in the open configuration the flexible display is positioned in a plane located under an obtuse angle with respect to the lower body side. Preferably the device body comprises at the lower body side an extending portion, the lower end of which is configured as surface support part.

In accordance with this aspect of the invention, by positioning in the open position the device body and the support frame under an obtuse angle the device is stably supported on a surface.

According to a "wrap" embodiment of the invention the support frame comprises hinge portions to enable in the closed configuration a wrapped storage position of the flexible display, one of the hinge portions being hingeably connected with the device body, the hingeable connection with the body being located at some distance above a plane through the lower body side of the device body.

According to another "wrap" embodiment of the invention the support frame comprises hinge portions to enable in the closed configuration a wrapped storage position of the flexible display, one of the hinge portions being hingeably connected with the device body, the hingeable connection being located near the lateral end of the extending portion of the device body comprising the surface support part.

According to a "book" embodiment of the invention the support frame comprises two portions, each configured to support a part of the display, the device body at its upper body side being a first portion of the support frame, a second portion of the support frame being hingeably connected with the first portion of the support frame, wherein the hingeable connection in the support frame in the open configuration is being moved upwardly in the direction of the display, enabling a stable positioning of the device in the open position of the display. This offers a special advantage for substantially symmetrical "book" concepts.

According to an asymmetrical "book" embodiment of the invention the support frame comprises two portions, each configured to support a part of the display, the device body at its upper body side being a first portion of the support frame, a second portion of the support frame being hingeably connected with the first portion of the support frame, in the open configuration the maximum height of the device being largest at the device body side, wherein in the open configuration of the support frame the flexible display is positioned in a plane located under an obtuse angle with respect to the lower sides of both frame portions. This enables a practical and stable open positioning of the display.

According to a "roll type" embodiment of the invention the display is a rollable display, the device body is housing a display roll element, said element extending partially below the lower body side and having a surface support part, in the open configuration the lower body side being positioned by the surface support part of said element under an angle with respect to the surface.

DETAILED DESCRIPTION

Unless otherwise indicated, all numbers expressing quantities of ingredients, dimensions reaction conditions and so forth used in the specification and claims are to be understood as being modified in all instances by the term "about".

In this application and the claims, the use of the singular includes the plural unless specifically stated otherwise. In addition, use of "or" means "and/or" unless stated otherwise. Moreover, the use of the term "including", as well as other forms, such as "includes" and "included", is not limiting. Also, terms such as "element" or "component" encompass both elements and components comprising one unit and elements and components that comprise more than one unit unless specifically stated otherwise.

The prior art display device 1 schematically shown in FIGS. 1A and 1B is a 'wrap' embodiment as disclosed in WO 2008/054206 A2 (herewith incorporated by reference). It comprises a continuous flexible display 2 and a display support frame comprising two support frame portions 3, 4. These portions 3, 4 are connected via hinge parts 5, 6, each comprising two hinges 5a, 5b and 6a, 6b (shown in FIG. 2) respectively, with a body 7 and are each structurally configured to support a respective portion of the flexible display 2. The two support frame portions are movable between a configuration shown in FIG. 1a with the flexible display in a closed storage position and a planar configuration shown in FIG. 1b with the flexible display in an open position.

In the open position as shown in FIG. 2 when such a device is put on a substantially flat surface 8, the device is unstable when the user is interacting with the device, e.g. by touching buttons on the body 7 to switch pages or touching the display in case it is a touch sensitive display, and the device rotates around the hinge part 6 (arrow a).

In FIG. 3 is schematically shown a symmetrical "book" type prior art embodiment. This device 9 comprises a flexible display and a display support frame with two support frame portions 10, 11 connected via a bridge formed by a curved hinge part 12 provided with two hinges. In such a dual hinge variant of the book, the hinge part can be very big, and therefore sticks out below the frame portions 10, 11. When the device is put on a surface 8, due to this hinge part 12 the device is unstable when the user is interacting with the device, e.g. by touching the display, and the device rotates around the curved hinge part 12 (arrow b).

In FIG. 4 is schematically shown another symmetrical "book" type prior art embodiment. This device 9 comprises between the frame portions 10, 11 a hinge part 13 with an upper wall, offering an underground for the display section in the hinge area. Due to the nature of hinge part 13 the device is unstable when the user is touching the display section in the hinge area, resulting in an upward rotation of the frame portions 10, 11 according to arrow c, d respectively.

A special form of the "book" type prior art device, shown in FIG. 5 is an asymmetric book device 14 with frame portions 15, 16. In this case the frame portion 15 is thick and the other portion 16 thin. This has some advantages such as for weight and volume distribution and touch support. However due to the distance of the frame portion 16 to the surface 8 the wiggle problem might be even larger in this concept when the user is interacting with the device. E.g. by touching the display at the side of the thin portion 16 the device rotates according to arrow e.

Another type of prior art device with a flexible display is the roll type device 17 as shown in FIG. 6 with a rollable display 18 and a housing 19. When such a device in its rolled out display is put on a surface 8, it can also be unstable, similar to the wrap and book-type devices.

Figure 7:
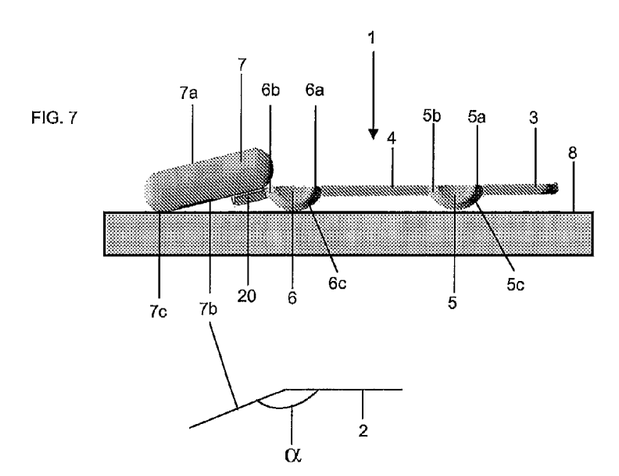
FIG. 7 shows a schematic side view of a 'wrap' type device in accordance with the invention in an operational position put on a surface.

The display device 1 of FIG. 7 is an embodiment of the invention and is of the "wrap" type described before and shown in FIGS. 1 and 2. Its device body 7 has upper and lower body sides 7a, 7b. The lower side 7b has near its end a support part 7c for supporting the body on the surface 8. The continuous flexible display 2 is supported by the support frame. The portion 4 of the support frame is hingeably connected by a connection part 20 at the device body 7 and is movable between a closed configuration for fixing the flexible display in a storage position and an open configuration for fixing the flexible display in an open position. The hinge parts 5, 6 are configured at their bottom side as surface support part 5c, 6c for supporting the support frame on the surface 8. In the open configuration shown in FIG. 7 both surface support parts 5c, 6c and the lower body side 7c are positioned in one plane (i.e. the flat surface), enabling a supporting of the surface support parts of the support frame and of the device body on the surface 8 for a stable user interaction with the device in the open position of the display. In this position the display 2 is positioned in a plane located under an obtuse angle 'α' with respect to the lower body side 7b. By this stable positioning the user can interact with buttons on the device body 7 and with the part of the display 2 above the portion 4, without creating unwanted movements of the display.

Figures 8A, 8B:
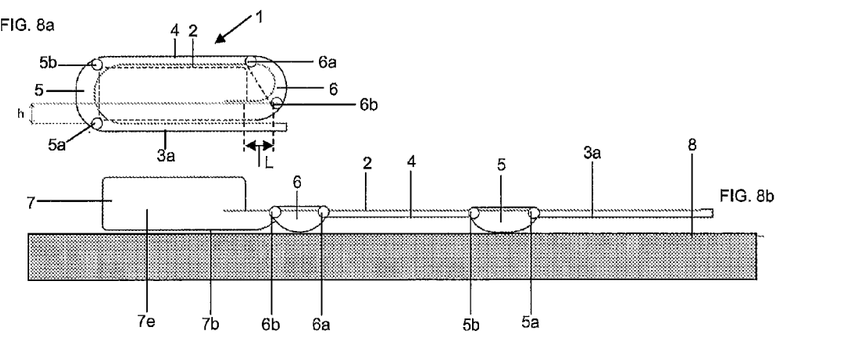
FIGS. 8a and 8b show a schematic side view of another "wrap" embodiment in a storage position (FIG. 8A) and an open position put on a surface (FIG. 8B), respectively, in accordance with the invention.

In another "wrap" type embodiment, shown in a storage position (FIG. 8a) and in an open position put on a surface 8 (FIG. 8b), the device body 7 comprises at the whole lower body side 7b a downwardly and in lateral direction outwardly extending portion 7e. The whole lower side of the portion 7e is configured as surface support part 7b. In this embodiment the hinge axis of hinge 6b is placed a distance h higher than the opposite hinge axis of hinge 5a and the hinge axis of hinge 6b is located at a distance L outwardly with respect to the axis of hinge 6a (see FIG. 8a). As shown in FIG. 8b this embodiment creates a flat shape for the device 1 when placed on a surface 8, i.e. both the support frame with the display 2 and the lower body side 7b are stable positioned substantially parallel to the surface 8. This embodiment enables to use a longer frame portion 3a and creates a longer display 2, whereas the positioning of the hinge part 6 in the storage position of FIG. 8a will not extend further outward than the device body 7 in the open position of FIG. 8b.

Figure 9:
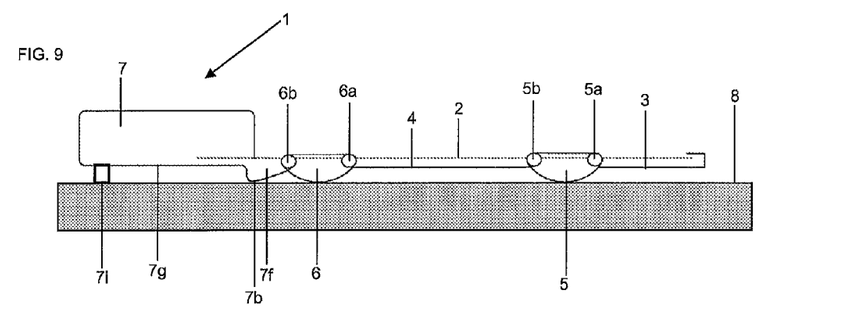
FIG. 9 shows a schematic side view of another "wrap" embodiment in an open position put on a surface, in accordance with the invention.

In an alternative "wrap" type embodiment, shown in an open position put on a surface 8 in FIG. 9, the device body 7 comprises at the lower side a downwardly and in lateral direction outwardly extending portion 7f with an lower wall configured as surface support part 7b. The portion 7f extends over only a minor part of the underside of the body 7 at the location of the corner of the body 7. The dimensions of a recess 7g at the underside of the body correspond with those of the frame portion 3. Due to the recess 7g and the dimensions of the portion 3 the thickness of the device in the storage position may be less than the thickness of the device shown in FIG. 8.

For stable positioning the device in the open position on a surface, under the body 7 downwardly extending portions, in this embodiment two protrusions 7i, are provided located at opposite sides of the display when the flexible display is in the storage position. Preferably the frame portion 3 comprises at the opposite sides recesses enabling positioning the protrusions 7i in the storage position of the display.

A variation of this solution would be to make these local protrusions 7i movable, preferably retractable from the open to the storage position. In open position of the device they move out of the device and become locked in their extended state. In this way these protrusions 7i do not necessarily need to be located at the sides of the support frame, but can be below them.

Figure 10A:
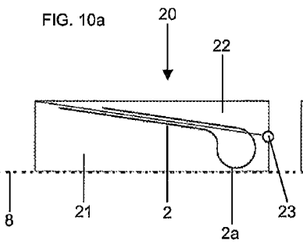
FIGS. 10a-10b respectively show a schematic side view of an embodiment of an asymmetrical 'book' type in a storage and an open position.
Figure 10B:
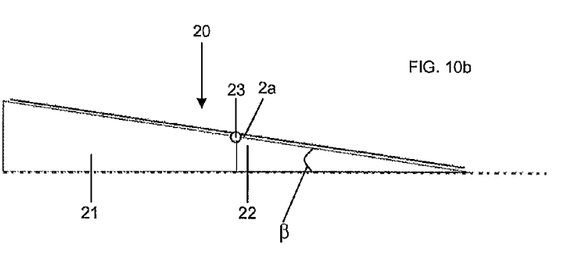

A schematic side view of an asymmetrical 'book' device 20 of the type shown before in FIG. 5, is shown in FIG. 10a in the storage position and FIG. 10b in the open position. In this embodiment the support frame comprises two portions 21, 22 each configured to support a part of the display 2. The device body at its upper body side is the first portion 21 of the support frame, whereas the second portion 22 is connected via a hinge 23 with the first portion 21. In the open configuration of FIG. 10b with the lower sides of the portions 21, 22 positioned on the surface 8 the maximum height of the device is largest at the device body side remote from the hinge 23 and smallest at the end of the portion 22. Due to this configuration of the device the flexible display 2 is stably positioned in a plane located under a sharp angle 'β' with respect to the lower sides of both frame portions. In the storage position of FIG. 10a is shown that the whole of a curved portion 2a of the display is located in the portion 21 of the device body near the hinge 23.

Figure 11A:
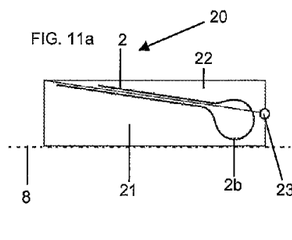
FIGS. 11a-11b respectively show a schematic side view of another embodiment of an asymmetrical 'book' type in a storage and an open position.

In the asymmetrical 'book' device shown in FIG. 11a alternatively a curved portion 2b of the display 2 may be located partly in the portion 21 of the device body and partly in the frame portion 22 near the hinge 23.

Figure 11B:
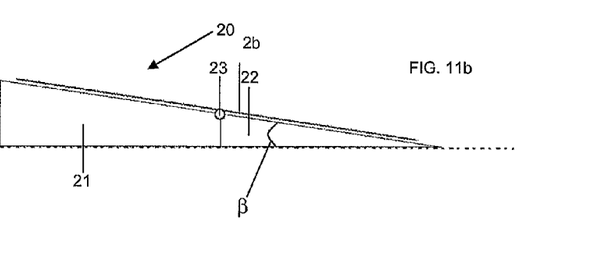

In the embodiments of FIGS. 10 and 11 in the open position shown in FIG. 10b, 11b the display 2 is positioned on the surface 8 in a comfortable reading position. It is noted that in the embodiment of FIG. 10 in the open position shown in FIG. 10b the supporting surface under the display of the portion 2a is larger than in the portion 2b in the open position of the embodiment of FIG. 11, shown in FIG. 11b. In the embodiment of FIG. 10 the recess in the supporting surface for the portion 2a is only configured in the portion 21, whereas in the embodiment of FIG. 11 the recess for the portion 2b in configured in both the portion 21 and the portion 22.

Figure 12A:
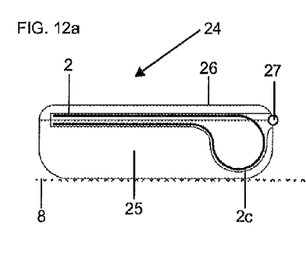
FIGS. 12a-12b respectively show a schematic side view of another embodiment of an asymmetrical 'book' type in a storage and an open position.

In FIG. 12 is shown a schematic side view of another asymmetrical 'book' device 24 of the type shown before in FIG. 5. In this embodiment the device 24 comprises two frame portions 25, 26 each configured to support a part of the display 2. The device body at its upper body side is a first portion 25 of the support frame, connected by a hinge 27 with a second portion 26 of the support frame. In the storage position of FIG. 12a is shown that the whole of a curved portion 2c of the display is located in the device body near the hinge 27.

Figure 12B:
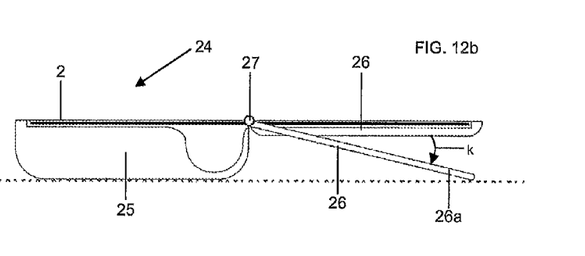

In the open configuration of FIG. 12b the maximum height of the device is largest at the device body side. The second portion 26 comprises a surface support part 26a. In the open position of the display the surface support part 26a can be moved by further rotating around the axis of hinge 27 in the direction of arrow k to a locked operational position enabling to compensate the height difference of the device at both sides of the hingeable connection. Thus in the open position of the display a stable horizontal positioning of the display and the device on the surface 8 is ensured.

Figure 13A:
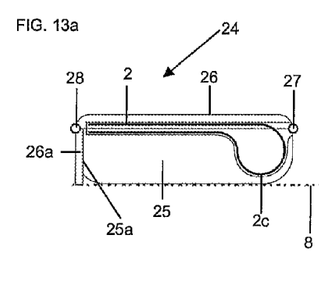
FIGS. 13a-13b respectively show a schematic side view of another embodiment of an asymmetrical 'book' type in a storage and an position.
Figure 13B:
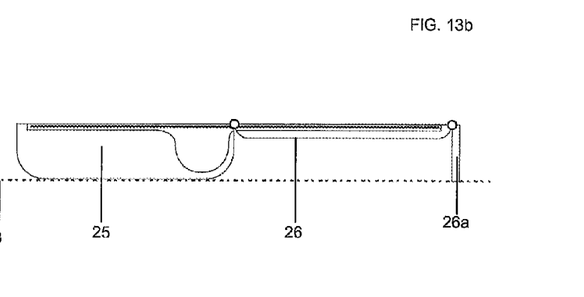
Figure 14A:
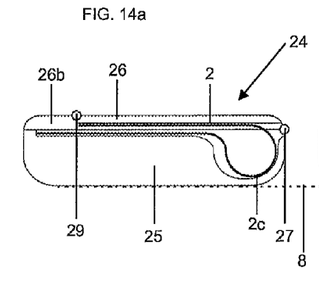
FIGS. 14a-14b respectively show a schematic side view of another embodiment of an asymmetrical 'book' type in a storage and an position.
Figure 14B:
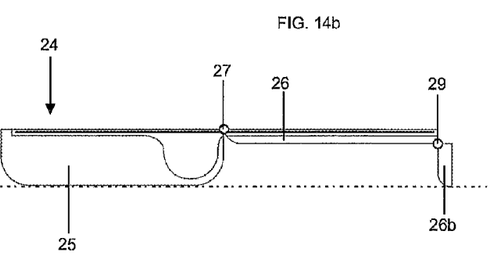

In FIG. 13 is shown a schematic side view of another asymmetrical 'book' device 24 of the type shown before in FIG. 5. In this embodiment at both lateral sides of the device a surface support part 26a is movable connected via a hinge 28 with the second portion 26 of the support frame. In the storage position shown in FIG. 13a these parts 26a are positioned in recesses 25a in the device body with the hinges 28 neighboring the recesses 25a. During movement to the operational position these surface support parts 26a move around the hinge 28 to the position shown in FIG. 13b, These parts 26a enable to compensate the height difference of the device at both sides of the hinge 27 and thus enable a stable horizontal position of the display 2 on the surface 8. Alternatively only one support part 26a is applied extending over the whole width of the device, In FIG. 14b is shown in the operational position an alternative embodiment of the device shown in FIG. 13 with means for enabling compensating the height difference of the device at both sides of the hinge 27. The means are in FIG. 14 configured as surface support parts 26b connected with the second portion 26 via hinges 29 located at the upper side of the device 24. In the storage position of FIG. 14a the surface support parts 26b are stored as a continuous part of the second portion 26. Alternatively only one support part 26b is applied extending over the whole with of the device.

Figure 15A:
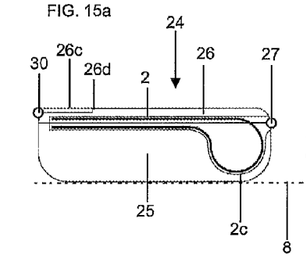
FIGS. 15a-15b respectively show a schematic side view of another embodiment of an asymmetrical 'book' type a storage and an position.
Figure 15B:
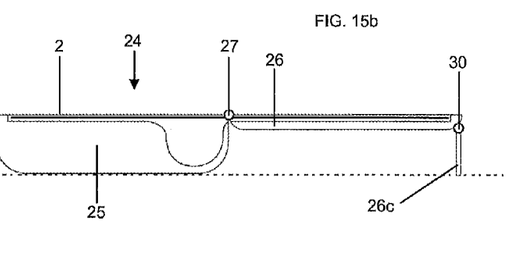

In FIG. 15b is shown in the operational position another alternative embodiment of the device shown in FIG. 13 with means for enabling compensating the height difference of the device at both sides of the hinge 27, in this embodiment surface support parts 26c, connected with the second portion 26 via hinges 30 located at the end of the second portion 26 remote from the hinge 27. In the storage position of FIG. 15a the surface support parts 26c are stored in recesses 26d in the second portion 26. Alternatively only one support part 26c is applied extending over the whole with of the device.

Figure 16A:
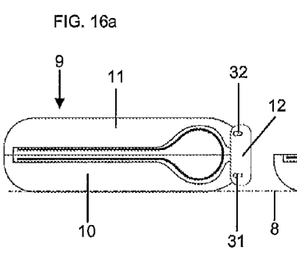
FIGS. 16a and 16b show a schematic side view of a symmetrical 'book' type embodiment in a storage position (FIG. 16A) put on a surface and an open position (FIG. 16B) put on a surface, respectively, in accordance with the invention.
Figure 16B:
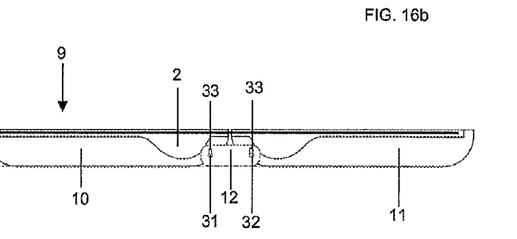

In FIG. 16 is schematically shown in side view a symmetrical "book" type of the type shown in FIG. 3 in the storage position (FIG. 16a) and open position (FIG. 16b). This device 9 comprises a flexible display 2 and a display support frame with two support frame portions 10, 11 connected via a hinge part 12. Two hinges 31, 32 are guided in slots 33 located in the hinge part 12 and extending substantially parallel in the frame portions 10, 11. As shown in FIG. 16b the hinge part 12 is moved upwardly when the device is opened and put on the surface 8. Since the bottom side of part 12 is now in line with the bottom side of the frame portions 10, 11 the device is positioned stably on the surface 8.

It is noted that preferably at least one of the desk support parts 26a of the embodiment of FIG. 13, the desk support parts 26b of the embodiment of FIG. 14 and the desk support part 26c of the embodiment of FIG. 15 is operational in the closed position of the support frame for locking the flexible display in the storage position.

Figure 17:
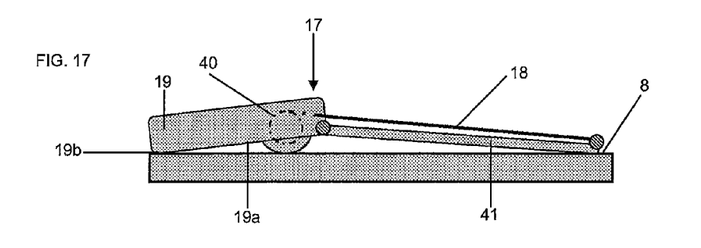
FIG. 17 shows a schematic side view of a 'roll' type device in accordance with the invention in an operational position put on a surface.

In FIG. 17 is schematically shown in side view a "roll" device 17 of the type of FIG. 3 in the open configuration. The device body 19 houses a display roll element 40 that extends partially below the lower body side 19a and is provided with a surface support part 19b. In the open configuration the display 18 is rolled outside the device body 19 and supported in a flat position by a support frame 41. In this configuration the lower body side 19a is positioned by the surface support part 19b under an angle with respect to the surface 8, whereas the display 18 is positioned in a plane located under an obtuse angle with respect to the lower body side 19a. By this stable positioning the user can interact with buttons on the device body 19 and with the display 18, without creating unwanted movements of the display. In this embodiment in the open position the display 18 is located on the surface 8 in a comfortable reading position.

Various embodiments of the disclosure could also include permutations of the various elements recited in the claims as if each dependent claim was a multiple dependent claim incorporating the limitations of each of the preceding dependent claims as well as the independent claims. Such permutations are expressly within the scope of this disclosure.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims. All references cited herein are incorporated in their entirety by reference.

What is claimed is:

1. A display device comprising:
    a device body with a first and second body sides, the second body side having a first surface support part for supporting the device body on a surface, wherein the first surface support comprises a part of a surface of the device body;
    a flexible display; and
    a support frame configured to support at least a part of the flexible display and comprising:
        a hinge portion rotatably connected with the device body, wherein the support frame is movable with respect to the device body between a closed configuration for fixing the flexible display in a storage position and an open configuration for fixing the flexible display in an open position; and
        a second surface support part for supporting the support frame on a surface;
    wherein in the open configuration the second surface support part and the first surface support part are positioned in one plane, enabling a supporting of the first and second surface support parts on a surface for a stable user interaction with the device in the open position of the flexible display, and
    wherein in the closed configuration the device body is partially covered by a portion of the support frame, and the flexible display is sandwiched between the device body and the portion of the support frame.

2. The display device in accordance with claim 1, wherein in the open configuration the flexible display is positioned in a plane located at an obtuse angle with respect to the second body side enabling a supporting of the first and second surface support parts on a surface.

3. The display device in accordance with claim 1, wherein the device body comprises at the second body side an extending portion, the lower end of which being configured as the first surface support part.

4. The display device in accordance with claim 3, wherein the extending portion is movably connected to a main portion of the device body.

5. The display device in accordance with claim 3, wherein the device body comprises two extending portions which are located at opposite sides of the flexible display when the flexible display is in the storage position.

6. The display device in accordance with claim 3, wherein in the open configuration both the support frame and the second body side are positioned substantially parallel to a surface.

7. The display device in accordance with claim 1, wherein in the open configuration both the support frame and the second body side are positioned at an angle with respect to a surface.

8. The display device in accordance with claim 1, wherein the hinge portion is configured to enable a wrapped storage position of the flexible display in the closed configuration, a hingeable connection with the body being located a distance above a plane through the second body side of the device body.

9. The display device in accordance with claim 3, wherein the hinge portion is configured to enable a wrapped storage position of the flexible display in the closed configuration, a hingeable connection being located near the lateral end of the extending portion of the device body.

10. The display device in accordance with claim 9, wherein a lower side of the hinge portion is configured as the second surface support part.

11. The display device in accordance with claim 1, wherein in the closed configuration the flexible display that is sandwiched between the device body and the portion of the support frame is formed to complementary fit an outer contour of the device body that is covered by the portion of the support frame.

12. The display device in accordance with claim 1, wherein in the closed configuration the flexible display is sandwiched between an outer surface of the device body and the portion of the support frame.

* * * * *